(12) United States Patent
Zimmitti et al.

(10) Patent No.: US 10,072,571 B2
(45) Date of Patent: Sep. 11, 2018

(54) GAS TURBINE ENGINE SPLIT TORQUE FAN DRIVE GEAR SYSTEM

(71) Applicant: United Technologies Corporation, Hartford, CT (US)

(72) Inventors: Jonathan F. Zimmitti, Glastonbury, CT (US); David Allen Stachowiak, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 548 days.

(21) Appl. No.: 14/597,410

(22) Filed: Jan. 15, 2015

(65) Prior Publication Data
US 2016/0208690 A1 Jul. 21, 2016

(51) Int. Cl.
*F02C 3/107* (2006.01)
*F02K 3/06* (2006.01)
*F02C 7/36* (2006.01)
*F16H 1/22* (2006.01)

(52) U.S. Cl.
CPC .............. *F02C 3/107* (2013.01); *F02C 7/36* (2013.01); *F02K 3/06* (2013.01); *F16H 1/22* (2013.01); *F05D 2220/323* (2013.01); *F05D 2260/40311* (2013.01)

(58) Field of Classification Search
CPC .... F02C 3/107; F02C 7/36; F02K 3/06; F16H 1/22; F05D 2220/323; F05D 2260/40311
See application file for complete search history.

(56) References Cited

U.S. PATENT DOCUMENTS

| | | | | |
|---|---|---|---|---|
| 4,567,784 A | * | 2/1986 | Hambric | ............... F16H 1/22 184/13.1 |
| 4,590,820 A | * | 5/1986 | Hambric | ............... F16H 1/22 74/467 |
| 4,964,315 A | * | 10/1990 | Willis, Jr. | ............. B64C 11/48 74/665 GA |
| 7,726,113 B2 | | 6/2010 | Orlando et al. | |
| 8,191,352 B2 | | 6/2012 | Schilling | |
| 8,397,603 B2 | * | 3/2013 | Gmirya | ............... B64C 27/12 74/409 |
| 8,590,286 B2 | | 11/2013 | Roberge et al. | |
| 8,683,892 B2 | | 4/2014 | Gmirya | |

(Continued)

FOREIGN PATENT DOCUMENTS

| | | |
|---|---|---|
| EP | 1918527 | 5/2008 |
| WO | 0017540 | 3/2000 |
| WO | 2008082336 | 7/2008 |

OTHER PUBLICATIONS

Extended European Search Report for European Application No. 16151138.1 dated Jun. 6, 2016.

*Primary Examiner* — Aaron R Eastman
(74) *Attorney, Agent, or Firm* — Carlson, Gaskey & Olds, P.C.

(57) ABSTRACT

A gas turbine engine includes a turbine section configured to rotate about an engine axis relative to an engine static structure. A fan section is configured to rotate about the engine axis relative to the engine static structure. A geared architecture operatively connects the fan section to the turbine section. The geared architecture includes an input gear and an output gear both configured to rotate about the engine axis. A set of idler gears are arranged radially outward relative to and operatively coupling with the input and output gears.

16 Claims, 3 Drawing Sheets

(56) References Cited

U.S. PATENT DOCUMENTS

| | | | |
|---|---|---|---|
| 2003/0015052 A1* | 1/2003 | Hulshof | F16H 1/22 |
| | | | 74/410 |
| 2004/0237684 A1 | 12/2004 | Bossler | |
| 2004/0255590 A1* | 12/2004 | Rago | F01D 15/10 |
| | | | 60/772 |
| 2005/0011307 A1 | 1/2005 | Gmirya | |
| 2007/0084184 A1* | 4/2007 | Orlando | F01D 1/26 |
| | | | 60/204 |
| 2008/0098716 A1* | 5/2008 | Orlando | F01D 15/12 |
| | | | 60/226.1 |
| 2009/0090096 A1* | 4/2009 | Sheridan | F02C 7/36 |
| | | | 60/226.3 |
| 2010/0105516 A1* | 4/2010 | Sheridan | F01D 25/18 |
| | | | 475/346 |
| 2012/0099988 A1* | 4/2012 | Charier | B64D 35/06 |
| | | | 416/129 |
| 2013/0223983 A1 | 8/2013 | Suciu et al. | |
| 2014/0216191 A1 | 8/2014 | Marsaudon et al. | |
| 2014/0227084 A1* | 8/2014 | Sheridan | F02C 7/36 |
| | | | 415/122.1 |

* cited by examiner

GAS TURBINE ENGINE SPLIT TORQUE FAN DRIVE GEAR SYSTEM

BACKGROUND

This disclosure relates to a geared architecture for a gas turbine engine used to reduce the rotational speed of the fan.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One proposed gear architecture coupling the turbine section to the fan section incorporates an epicyclic gear train using a sun gear coupled to a ring gear by a circumferential array of intermediate gears in a planetary or star gear arrangement. The geared architecture reduces the rotational speed of the fan in a high bypass flow engine configuration.

SUMMARY

In one exemplary embodiment, a gas turbine engine includes a turbine section that is configured to rotate about an engine axis relative to an engine static structure. A fan section is configured to rotate about the engine axis relative to the engine static structure. A geared architecture operatively connects the fan section to the turbine section. The geared architecture includes an input gear and an output gear that are both configured to rotate about the engine axis. A set of idler gears are arranged radially outward relative to and operatively coupling with the input and output gears.

In a further embodiment of the above, the turbine section includes a high pressure turbine mounted for rotation to a high spool. A low pressure turbine is mounted for rotation to a low spool and is arranged downstream from the high pressure turbine. The low pressure turbine is coupled to the input gear.

In a further embodiment of any of the above, the engine static structure provides a bypass flow path and a core flow path. The turbine section is arranged in the core flow path and the fan section is arranged in the bypass flow path.

In a further embodiment of any of the above, the fan section is coupled to the output gear.

In a further embodiment of any of the above, the input gear and the output gear are arranged axially adjacent to one another.

In a further embodiment of any of the above, the set of idler gears are mounted to the engine static structure and fixed against rotation about the engine axis.

In a further embodiment of any of the above, the set of idler gears includes multiple idler shafts that are arranged circumferentially about the input gear and the output gear.

In a further embodiment of any of the above, the input gear has a first and second input gear portions axially spaced from one another and that provide different tooth geometries than one another.

In a further embodiment of any of the above, the output gear has a first and second output gear portions axially spaced from one another and that provide different tooth geometries than one another.

In a further embodiment of any of the above, each idler shaft has a first idler gear meshing with the input gear and a second idler gear meshing with the output gear.

In a further embodiment of any of the above, the set of idler gears includes first and second sets of idler gears. The first set of idler gears meshing with the input gear and the second set of idler gears. The second set of idler gears meshing with the output gear.

In a further embodiment of any of the above, the second set of idler gears is arranged radially outward from the first set of idler gears.

In a further embodiment of any of the above, rolling element bearings support the set of idler gears relative to the engine static structure.

In a further embodiment of any of the above, the geared architecture provides a gear reduction ratio in the range of 8:1.

In a further embodiment of any of the above, the geared architecture is arranged forward of the turbine section.

In a further embodiment of any of the above, a compressor section is arranged upstream of the turbine section and downstream from the fan section. The geared architecture is arranged forward of the compressor section.

In a further embodiment of any of the above, the geared architecture is without a ring gear.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
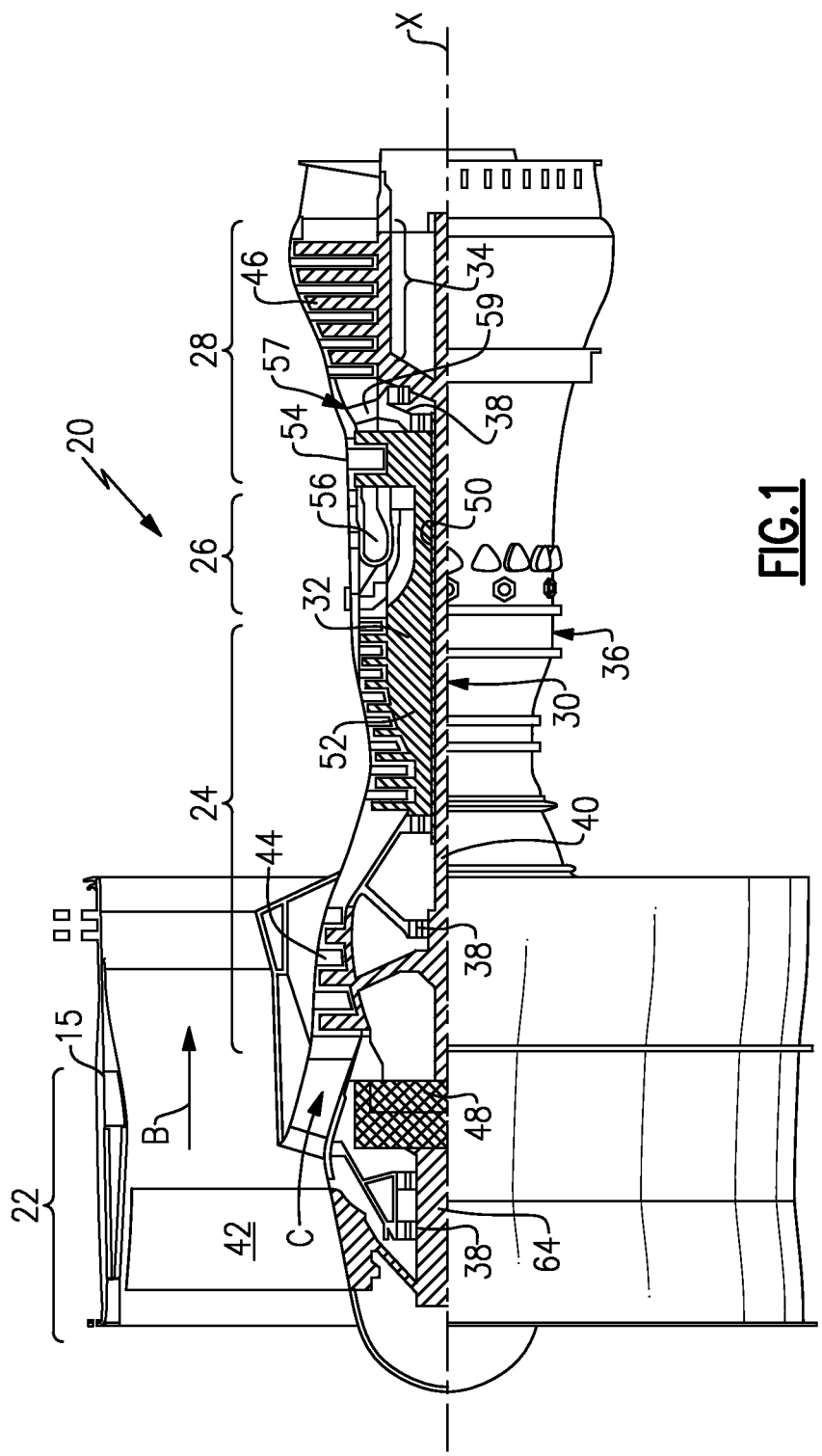
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 (2.3:1) and the low pressure turbine 46 has a pressure ratio that is greater than about five. In one example, the gear reduction ratio is about 8:1 or greater. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The turbine section 28 is operatively connected to the fan section 22 by a geared architecture 48 that provides a split torque arrangement rather than an epicyclic gear train arrangement. That is, a ring gear is not used in the gear train.

The geared architecture 48 includes an input gear 60 and an output gear 62 both configured to rotate about the engine axis X. In the example embodiment, the input and output gears 60, 62 are arranged axially adjacent to one another. The input gear 60 is coupled to the inner shaft 40, and the output gear 68 is coupled to a fan shaft 64, which rotationally drives the fan 42.

A set of idler gears 66 is arranged radially outward relative to and operatively coupling with the input and output gears 60, 62. In the example, a circumferential array of four idler gears are provided, however, it should be understood that any number may be used depending upon the application.

Figure 2A:
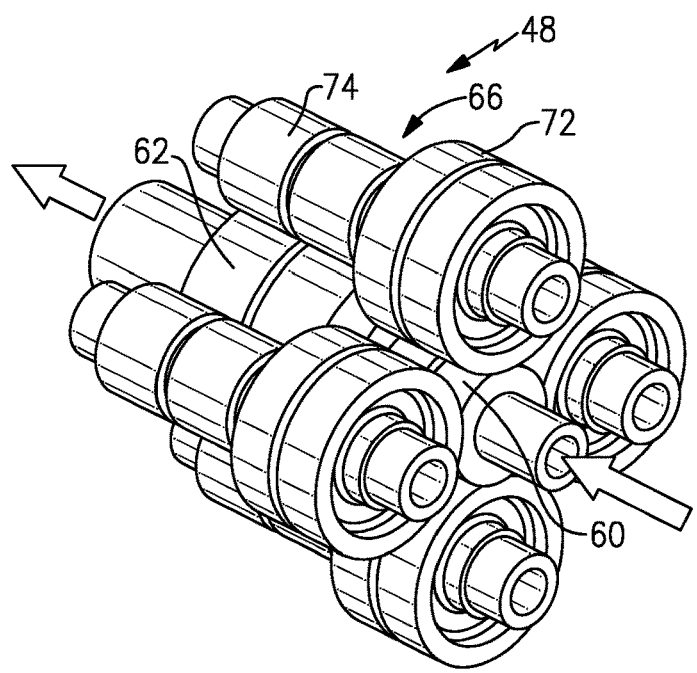
FIGS. 2A and 2B are respectively perspective and cross-sectional views of a geared architecture embodiment.
Figure 2B:
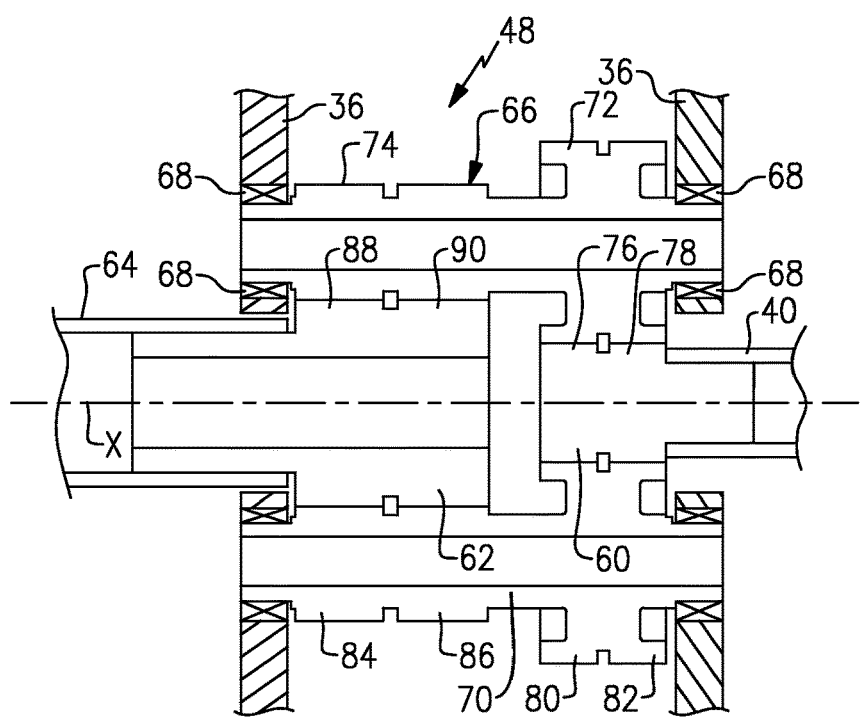

Referring to FIG. 2B, the set of idler gears 66 are mounted to the engine static structure 36 and fixed against rotation about the engine axis X. In one example, the set of idler gears is supported relative to the engine static structure 36 by rolling element bearings 68, such as spherical bearings, needle bearings, tapered bearings or other suitable rolling element bearings in which a set of rolling element bearings is provided between inner and outer races.

The set of idler gears 66 include multiple idler shafts 70 arranged circumferentially about the input and output gears 60, 62. Each idler shaft 70 has a first idler gear 72 meshing with the input gear 60 and a second idler gear 74 meshing with the output gear 62. In this configuration, the input and output gears 60, 62 rotate in the same direction about the axis X. A simplified torque split configuration is provided in which no ring gear is needed.

The gear meshing loads can be managed by providing multiple gear mesh surfaces between intermeshing gears. In the example, the input gear 60 has first and second input gear portions 76, 78 that mate with corresponding first and second idler gear portions 80, 82. In a similar manner, the output gear 68 includes first and second output gear portions 88, 90 that intermesh with third and fourth idler gear portions 84, 86. The multiple gear portions of each gear provide, for example, different tooth geometries than one another. In one example, the different tooth geometries may provide helical gear teeth oriented at different angles. Although multiple gear meshes are shown at the gear interfaces, a single gear mesh may be used.

Figure 3A:
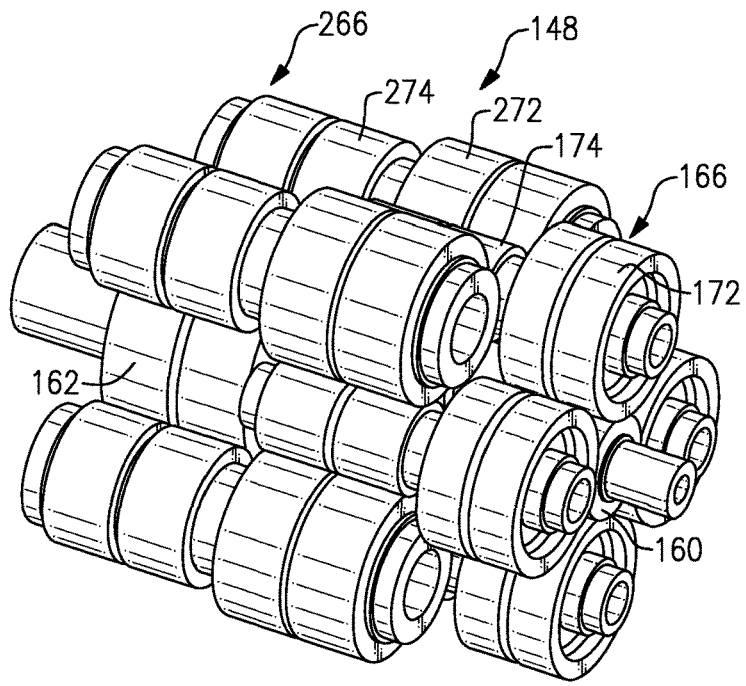
FIGS. 3A and 3B are respectively perspective and cross-sectional views of another geared architecture embodiment.
Figure 3B:
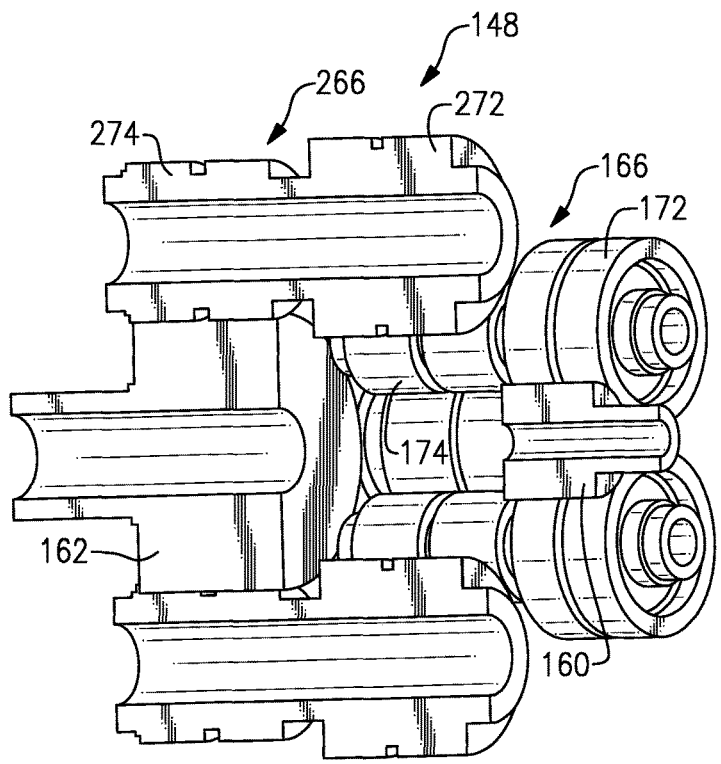

Referring to FIGS. 3A and 3B, another geared architecture 148 is shown in which first and second sets of idler gears 166, 266 couple the input gear 160 to the output gear 162. Both the first and second sets of idler gears 166, 266 are supported by the engine static structure 36 and fixed against rotation relative to the engine axis X. The first set of idler gears 166 includes a first idler gear 172 meshing with the input gear 60. The second idler gear 174 of the first set of idler gears 166 meshes with a third idler gear 172 of the second set of idler gears 266. A fourth idler gear 174 of the second set of idler gears 266 meshes with the output gear 162. The input and output gears 160, 162 rotate in an opposite direction about the axis X in this configuration. The first and second sets of idler gears 166, 266 provide additional gear reduction over the geared architecture 48, if desired.

The disclosed split torque geared architecture provides a simplified arrangement over epicyclic gear trains, enabling less rigorous lubrication and use of simple rolling element bearings.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a turbine section configured to rotate about an engine axis relative to an engine static structure;
   a fan section configured to rotate about the engine axis relative to the engine static structure; and
   a geared architecture operatively connects the fan section to the turbine section, the geared architecture includes an input gear and an output gear both configured to rotate about the engine axis, and a set of idler gears arranged radially outward relative to and operatively coupling with the input and output gears, wherein the geared architecture is without a ring gear.

2. The engine according to claim 1, wherein the turbine section includes a high pressure turbine mounted for rotation to a high spool, and low pressure turbine mounted for rotation to a low spool and arranged downstream from the high pressure turbine, the low pressure turbine coupled to the input gear.

3. The engine according to claim 2, wherein the engine static structure provides a bypass flow path and a core flow path, the turbine section arranged in the core flow path, and the fan section arranged in the bypass flow path.

4. The engine according to claim 2, wherein the fan section is coupled to the output gear.

5. The engine according to claim 1, wherein the input gear and the output gear are arranged axially adjacent to one another.

6. The engine according to claim 1, wherein the set of idler gears are mounted to the engine static structure and fixed against rotation about the engine axis.

7. The engine according to claim 6, wherein the set of idler gears includes multiple idler shafts arranged circumferentially about the input gear and the output gear.

8. The engine according to claim 7, wherein the input gear has a first and second input gear portions axially spaced from one another and that provide different tooth geometries than one another.

9. The engine according to claim 7, wherein the output gear has a first and second output gear portions axially spaced from one another and that provide different tooth geometries than one another.

10. The engine according to claim 7, wherein each idler shaft has a first idler gear meshing with the input gear and a second idler gear meshing with the output gear.

11. The engine according to claim 7, wherein the set of idler gears includes first and second sets of idler gears, the first set of idler gears meshing with the input gear and the second set of idler gears, and the second set of idler gears meshing with the output gear.

12. The engine according to claim 11, wherein the second set of idler gears is arranged radially outward from the first set of idler gears.

13. The engine according to claim 6, comprising rolling element bearings that support the set of idler gears relative to the engine static structure.

14. The engine according to claim 1, wherein the geared architecture provides a gear reduction ratio in the range of 8:1.

15. The engine according to claim 1, wherein the geared architecture is arranged forward of the turbine section.

16. The engine according to claim 15, comprising a compressor section arranged upstream of the turbine section and downstream from the fan section, the geared architecture arranged forward of the compressor section.

* * * * *